United States Patent
Xiao et al.

(10) Patent No.: US 8,731,566 B2
(45) Date of Patent: May 20, 2014

(54) DEVICE AND A METHOD FOR MULTIPLE NUMBERS FOR ONE USER

(75) Inventors: Lei Xiao, Beijing (CN); Lansheng Wang, Beijing (CN); Shihong Zheng, Beijing (CN)

(73) Assignee: Optis Wireless Technology, LLC, Plano, TX (US)

( * ) Notice: Subject to any disclaimer, the term of this patent is extended or adjusted under 35 U.S.C. 154(b) by 662 days.

(21) Appl. No.: 12/671,128

(22) PCT Filed: Aug. 12, 2008

(86) PCT No.: PCT/SE2008/050915
§ 371 (c)(1),
(2), (4) Date: Jan. 28, 2010

(87) PCT Pub. No.: WO2009/022978
PCT Pub. Date: Feb. 19, 2009

(65) Prior Publication Data
US 2010/0203894 A1    Aug. 12, 2010

(30) Foreign Application Priority Data
Aug. 16, 2007    (SE) .................................. 0701888

(51) Int. Cl.
*H04W 8/02*    (2009.01)

(52) U.S. Cl.
USPC ........ 455/445; 455/418; 455/419; 455/432.3; 455/433; 455/466

(58) Field of Classification Search
CPC ........... H04W 8/02; H04W 8/04; H04W 8/18; H04W 8/26; H04W 8/28
USPC ............................... 455/425, 432.3, 461, 551
See application file for complete search history.

(56) References Cited

U.S. PATENT DOCUMENTS

| | | | |
|---|---|---|---|
| 2005/0192035 A1* | 9/2005 | Jiang | 455/461 |
| 2006/0116105 A1 | 6/2006 | Frankel et al. | |
| 2008/0089487 A1* | 4/2008 | Chen et al. | 379/88.12 |

FOREIGN PATENT DOCUMENTS

| | | |
|---|---|---|
| CN | 1411314 A | 4/2003 |
| CN | 1476272 A | 2/2004 |

(Continued)

OTHER PUBLICATIONS

International Search Report dated Jan. 14, 2009 (4 pages).

(Continued)

*Primary Examiner* — Rafael Pérez-Gutiérrez
*Assistant Examiner* — Joshua Schwartz
(74) *Attorney, Agent, or Firm* — Vincent J. Allen; Carstens & Cahoon, LLP

(57) ABSTRACT

The invention discloses a method (500) for a cellular communications network (100), according to which there can be a plurality of users (110, 120) in the network; said network comprises control functions (NodeB, RNC, MSC, HLR) for receiving, connecting and directing traffic to and from users. According to the method (515), at least a number of said users are associated with individual user identities which are unique in said network, and least two addresses such as numbers which may be used by a first user (110) in order to establish communication with a second user (120) in the network are mapped (525) to the unique user identity which is held by the second user, so that the entering or dialling of either of said at least two addresses by said first user will result (540) in an attempt by the network to establish communication with the second user.

5 Claims, 7 Drawing Sheets

(56) References Cited

FOREIGN PATENT DOCUMENTS

| | | |
|---|---|---|
| EP | 1 887 824 A1 | 2/2008 |
| GB | 2 439 370 A | 12/2007 |
| WO | WO 98/53629 A1 | 11/1998 |
| WO | WO 2007/033546 A1 | 3/2007 |

OTHER PUBLICATIONS

English Translation—First Office Action, CN Patent Application No. 200880103738.3, Apr. 18, 2012.

* cited by examiner

DEVICE AND A METHOD FOR MULTIPLE NUMBERS FOR ONE USER

TECHNICAL FIELD

The present invention discloses a method and a device for using a plurality of numbers for one and the same user in a cellular telecommunications system.

BACKGROUND

In mobile communication system such as, for example, GSM, WCDMA or TD-SCDMA, there is a unique number for each user, which is used to distinguish between the different users within the system. This number is usually a number for a mobile telephone or a similar device in the system.

However, there is now a growing demand from mobile users to use more than one number in parallel; it may, for example, be desirable to be able to be reached via one number for business calls, via another number for private calls and via yet another number for family purposes, etc.

There are some more or less obvious solutions for these requirements, such as, for example, carrying around more than one mobile phone or exchanging SIM (Subscriber Identity Module) cards in one and the same telephone or terminal. All of these solutions are obviously quite inconvenient for a user.

SUMMARY

It is thus one purpose of the present invention to facilitate for a user in a cellular communications system who wishes to be reached via more than one telephone number in one and the same terminal or telephone.

This purpose is addressed by the present invention in that it discloses a method for use in a cellular communications network in which there can be a plurality of users. The network comprises control functions for receiving, connecting and directing traffic to and from said users, and at least a number of the users are associated with respective individual user identities which are unique in the network.

According to the method of the invention, at least two addresses such as numbers which may be used by a first user in order to establish communication with a second user in the network are mapped to the unique user identity which is held by the second user, so that the entering or dialling of either of the at least two addresses by the first user will result in an attempt by the network to establish communication with the second user.

In one embodiment of the invention, the second user can set one of the at least two addresses as his primary address or number, for use in outgoing traffic, suitably but not necessarily with the primary address or number being set as a default primary number.

The invention also discloses a terminal for use in a system in which the invention is applied.

BRIEF DESCRIPTION OF THE DRAWINGS

The invention will be described in more detail in the following, with reference to the appended drawings, in which.

DETAILED DESCRIPTION

The invention will be described below using terms borrowed from one or more specific cellular systems, such as, for example, GSM, WCDMA or TD SCDMA. These terms, however, are merely used in order to facilitate the reader's understanding of the invention, and should not be used in order to restrict the scope of protection sought for or given to the present invention.

Figure 1:
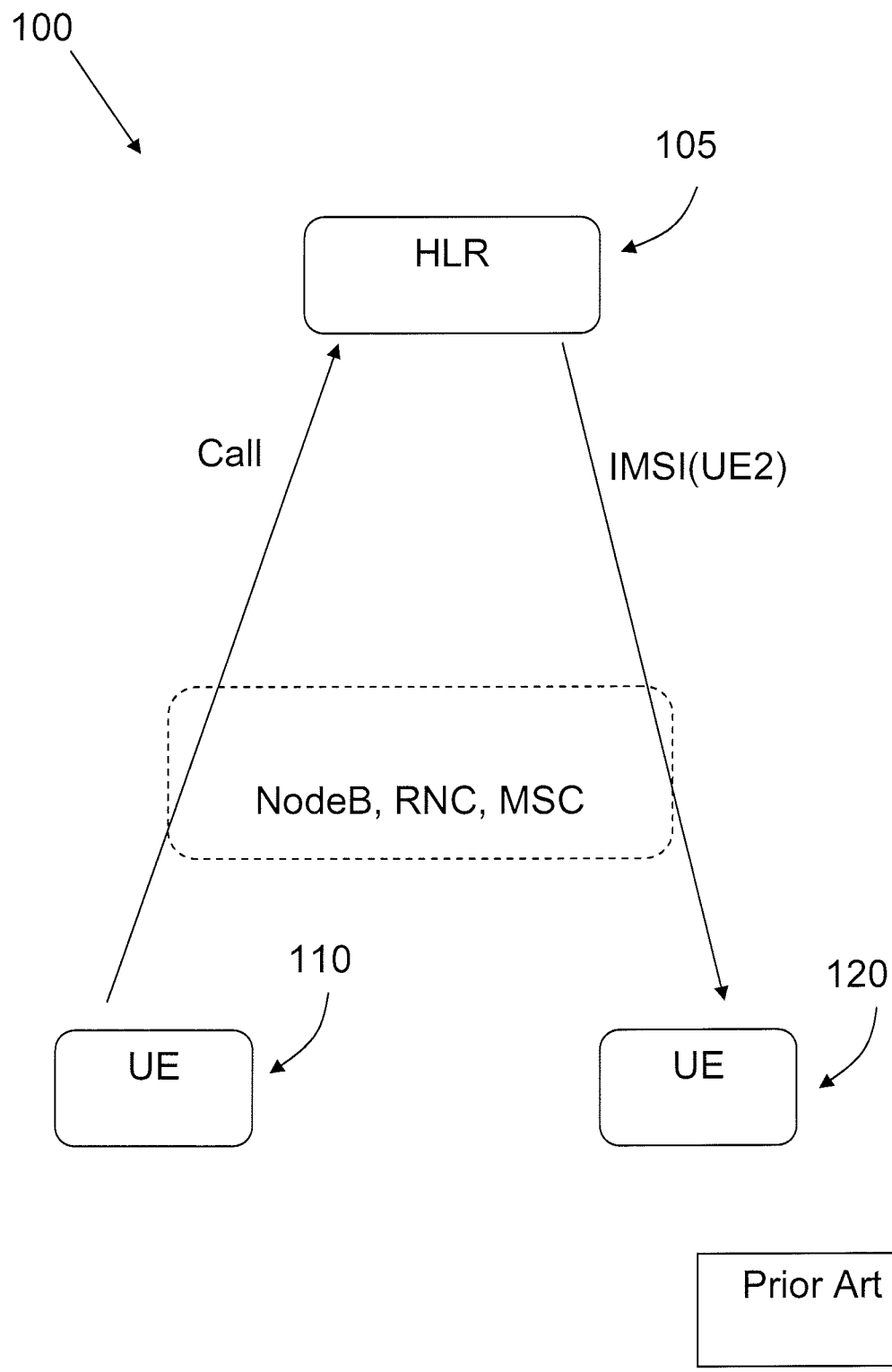
FIG. 1 shows a schematic overview of prior art.

FIG. 1 shows a schematic overview of a basic function of a system 100 in which the invention is suitably applied. The system 100 can accommodate a number of users, "UE"s, (User Equipment), two of which, 110, 120, are shown in FIG. 1 as examples. The invention will be explained below by means of an example in which the user of UE 110 attempts to make a call to the user of UE 120.

The system 100 also comprises a number of cells, and the UEs 110, 120 can be either in one and the same cell or in different cells.

The system 100 comprises a number of nodes or functions which serve to receive, connect and direct traffic to and from users in the system, so that a call from UE 110 to UE 120 will involve the nodes shown in FIG. 1 as NodeB, RNC, MSC and HLR. Some of the nodes in the system 100 are shown grouped together schematically in a box with dashed lines.

A short explanation of the nodes in the box with dashed lines is as follows:
  NodeB: For each cell in the system, there is a controlling node for the cell, the NodeB,
  RNC: Radio Network Controller, can control one or more NodeB,
  MSC: Mobile Services Switching Centre, a switching node that serves the network and switches the traffic to/from the UEs in the proper manner.

A node in the system which is particularly affected by the invention is the HLR, the Home Location Register, shown as 105 in FIG. 1, which is essentially a database where copies of each user's profile are stored.

In the system 100, each user has a unique identity, a so called IMSI, International Mobile Subscriber Identity, which is stored in a database such as the HLR. Thus, when a UE, such as UE 110, makes a call to another user, such as UE 120, the phone number of UE 120 is entered by the user of UE 110 and is sent through the system to the HLR, where the phone number of UE 120 is matched with the IMSI of UE 120 in order for the call to be directed and connected properly.

According to the invention, at least two addresses such as, for example, numbers, are mapped, suitably by a database such as the HLR, to one and the same user identity, such as an IMSI.

Figure 2:
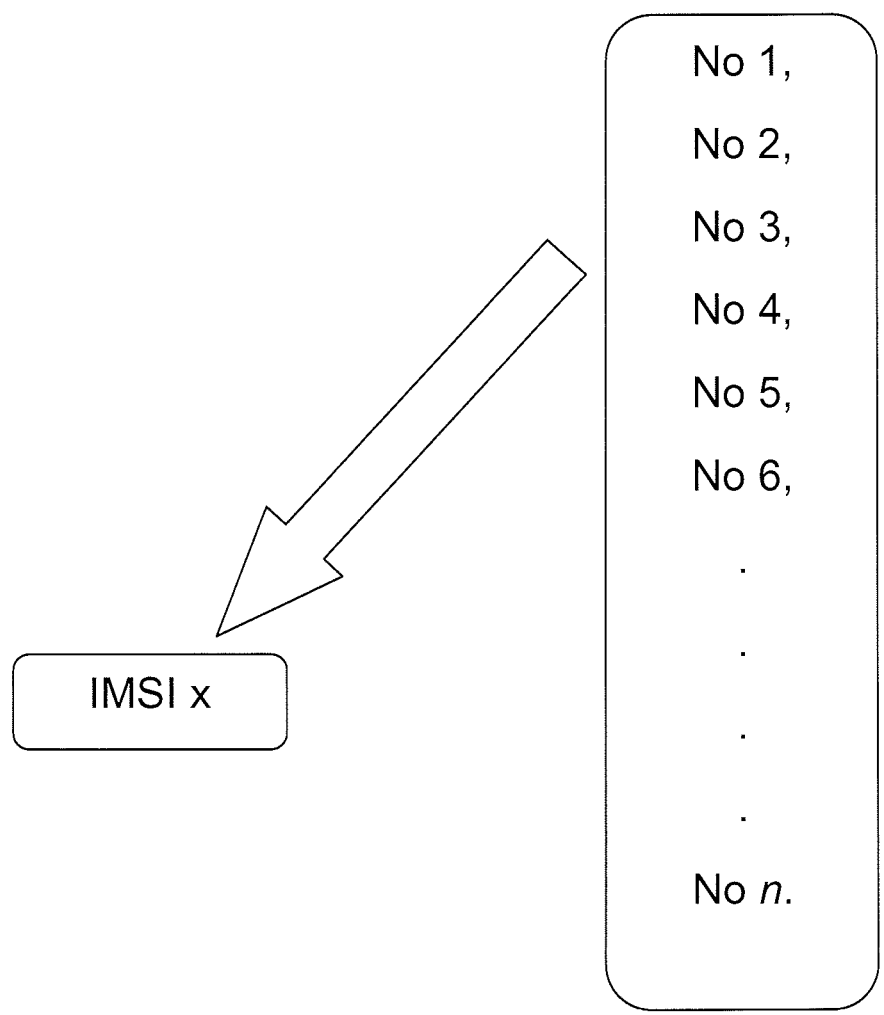
FIGS. 2-4 show principles used in the invention.

The notion of more than one address or number being mapped to one and the same IMSI is schematically shown in FIG. 2, which shows a plurality of numbers, 1–n, all of which are mapped to one and the same IMSI, here shown as IMSI x.

Figure 3:
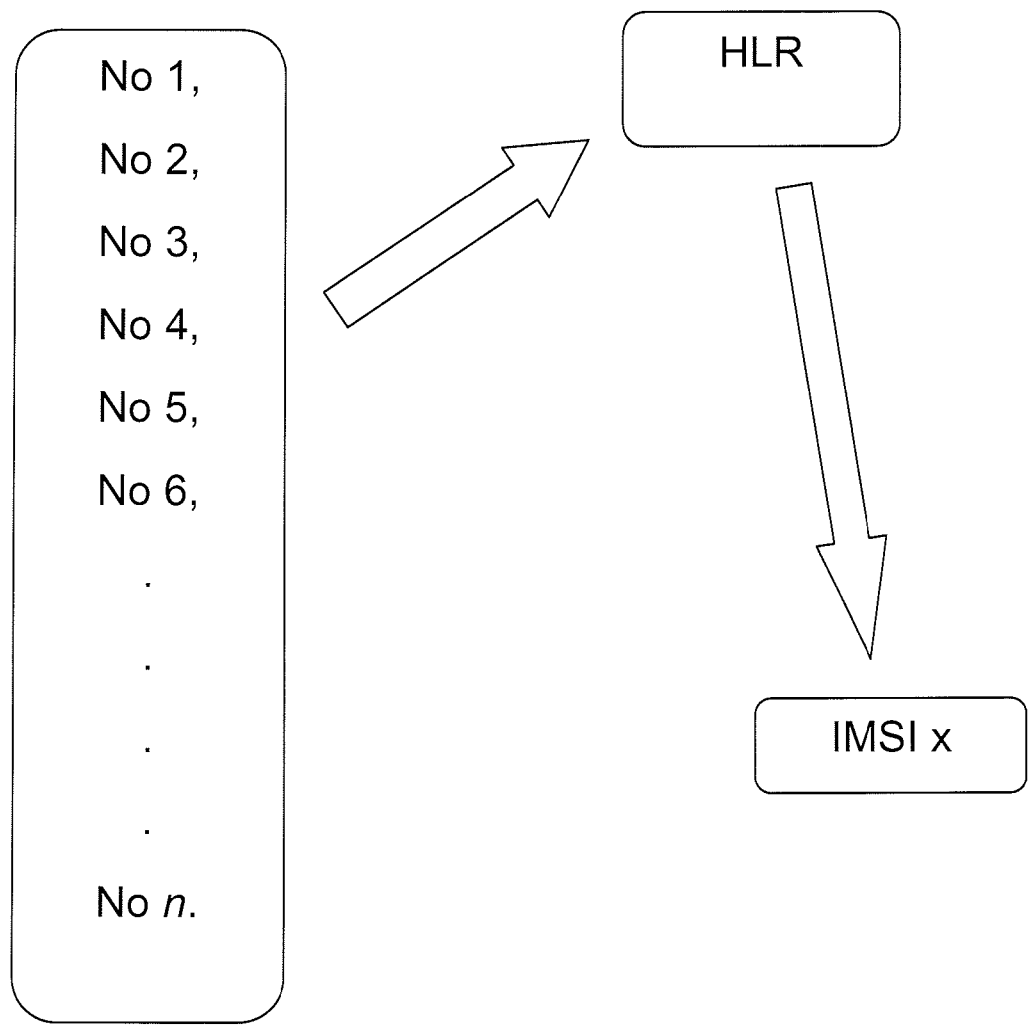

The same notion is also shown in FIG. 3, which shows that the plurality of numbers, 1–n, are all mapped by the HLR to one and the same IMSI, i.e. IMSI x.

Thus, one and the same e UE may be addressed by a variety of different numbers, all of which result in the calls being directed and connected to that particular UE, or at least the calls will be attempted to be directed and connected to that UE, although this may not be completed, due to the possibility of, for example, a busy line.

The use of more than one number by one and the same user is useful if, for example, a user wishes to be reached via one number for work purposes and via a second number for family purposes etc. The use of more than one number for one and the same user can also be utilized by system operators, for example in order to have different charging policies or contracts for different number which belong to one and the same user.

In addition, as will be explained in more detail below, a user who has a plurality of numbers mapped to his IMSI in the database can also set one of his numbers as his "primary outgoing number", i.e. a number which will by default be charged for a call or a data session, and which will appear as the calling number in a "User ID" display of a receiving party.

The setting of the primary number can either be done when the user makes a call, or it can be set as a "default primary number", i.e. a primary number which the database will use for outgoing traffic until further notice, i.e. until it is changed again. The default number can be set by the user, or it can be set by the system operator when the user acquires more than one address or number.

A user with more than one number mapped to his IMSI can then change the primary or default number for outgoing and/or incoming calls in a number of ways according to the present invention. Examples of such ways are:

The user sends as text message, a so called SMS, Short Message Service, to a predefined SMS centre in the system, with a command to change the user's primary number for incoming and/or outgoing calls. This command is then forwarded by the network to the HLR, where the change is made. Such an SMS would preferably be in a predefined format, and would contain the new primary number. An example of the format of such an SMS could be "1234567=new primary no.", which would set the user's new primary number to 1234567. The SMS centre would suitably be a so called "application server", also sometimes referred to as an SP/CP server, i.e. a Service Provider/Content Provider server.

The user dials a specific predefined number in order to trigger a procedure for changing his primary number, as a result of which a text menu is returned, by means of which the change can be affected. Suitably, this is done by means of a so called USSD procedure, an Unstructured Supplementary Service Data procedure.

The user sends a command via a special interface in his terminal to have the change carried out. In this embodiment, user terminals thus need an interface for such a feature, for example a special menu.

In the methods listed above for changing the user's primary number, the information or commands from the UE will go through the network "transparently", i.e. no changes need to be made to the network nodes for this functionality, except for the HLR, which must have the ability to accept a command for a change of a user's primary number.

Figure 4:
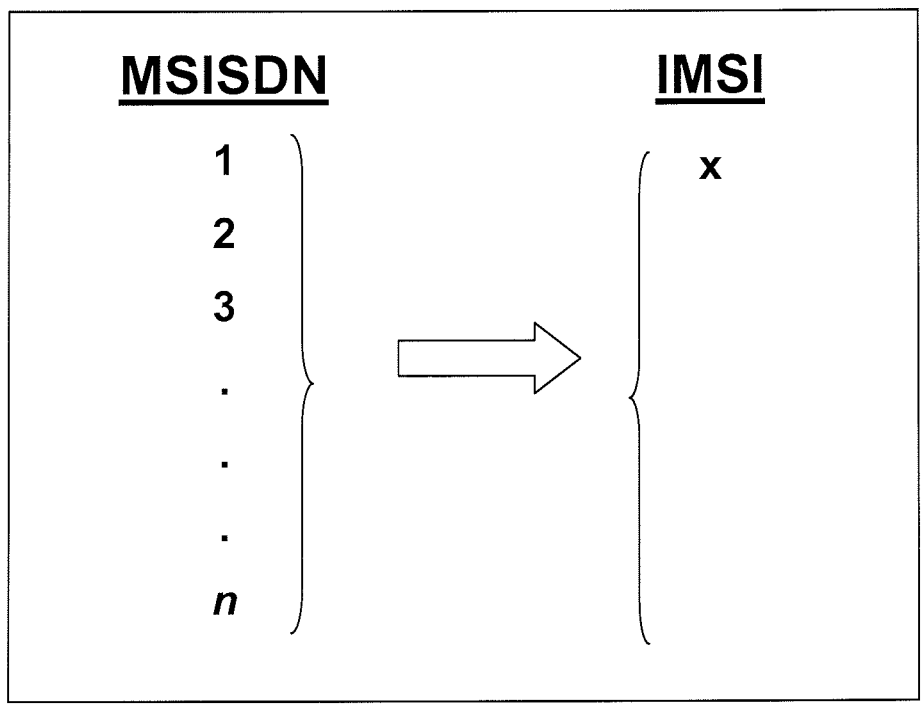

In a special embodiment of the invention, the notion of having more than one number for a user is achieved by means of assigning more than one so called MSISDN, Mobile Station ISDN Number, to a user. An address or a phone number which corresponds to the MSISDN is then mapped, suitably by a database such as the HLR, to the user's IMSI, as shown in FIG. 4.

If MSISDNs are used to implement the invention, then one of these MSISDNs can be defined as the primary MSISDN, which would correspond to the idea of a primary number, as explained previously.

If and when a user's primary number is changed, the HLR needs to update the so called VLR, the Visitor Location register, a database which is usually combined with the MSC, the Mobile Switching Centre, of the system. There are two preferred ways in which the HLR may update the VLR regarding a change in a user's primary number:

1. The MSC and the VLR are "transparent" with regard to the use of multiple numbers, i.e. only the HLR is aware of the fact that a user uses multiple numbers. The changes made by the HLR to the VLR/MSC are handled by the HLR.
2. The MSC/VLR are also aware of the use of multiple numbers for a user, i.e. multiple numbers per IMSI as well as the notion of a user having a primary number (primary MSISDN). In such an embodiment, the following would happen: during the so called location update procedure, the HLR would send to the MSC/VLR the user's subscriber data, including all f the user's numbers, with one of them being identified as the primary number. MSC/VLR is also aware of these subscriber data. When the user's primary number is changed in the HLR, the HLR will send updated subscriber data to the VLR in order to inform the VLR of the change. In one version of this embodiment, for an originating call, the subscriber user can specify which number that should be used as the calling party number, for example by adding more information together with called party number. For example, if the called party number is 1234567 and the user want to use number N as the calling number, he could dial "1234567*#N". In the originating MSC, this kind of dialled number would be interpreted, and the specified calling number would be used. If the calling number is not specified, the MSC will use the primary number as calling number.

Figure 5:
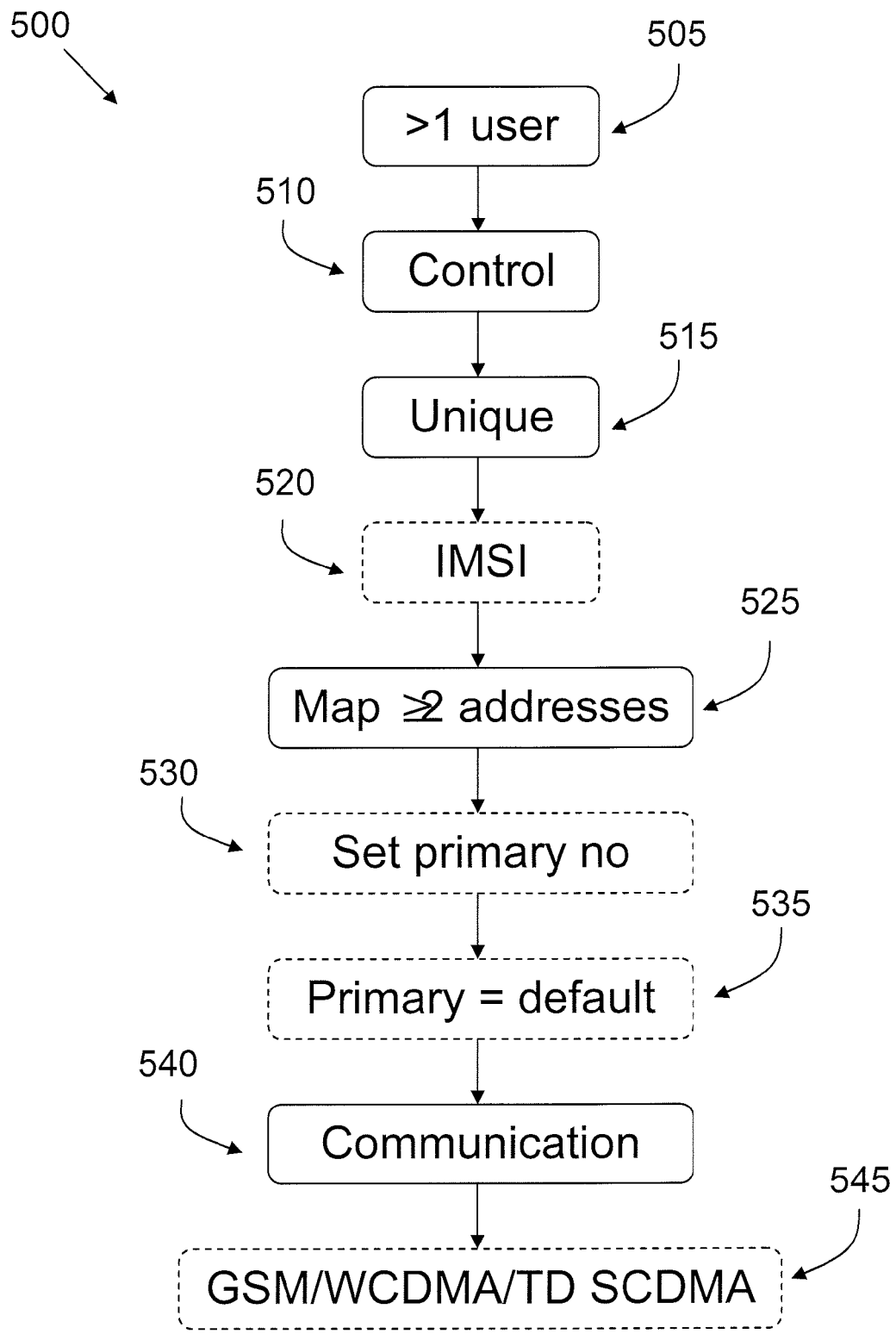
FIG. 5 shows a flow chart of a method of the invention.

FIG. 5 shows a schematic flow chart of a method 500 of the invention. Steps which are options or alternatives are shown with dashed lines.

As has also been explained above, the inventive method 500 is intended for use in a cellular communications network, and as indicated in step 505, according to the method, there can be a plurality of users in the network. As shown in step 510, the network comprises control functions for receiving, connecting and directing traffic to and from said users. According to the method of the invention, as shown in step 515, at least a number of users are associated with respective individual user identities which are unique in the network, and at least two addresses such as numbers which may be used by a first user in order to establish communication with a second user in the network are mapped, step 525, to the unique user identity which is held by the second user, so that the entering or dialling of either of said at least two addresses by said first user will result, step 540, in an attempt by the network to establish communication with the second user.

As shown in step 530, in one embodiment, the second user can set one of said at least two addresses as his primary address or number, for use in outgoing traffic, and as shown in step 535, in one version of this embodiment, the primary address or number is set as a default primary number.

As indicated in step 520, in one embodiment the unique user identity is the user's IMSI, the International Mobile Subscriber Identity.

Step 545 shows that the method may be used in a network which operates according to one of the following system standards:

GSM, Global System for Mobile communications,
WCDMA, Wideband Code Division Multiple Access,
TD SCDMA, Time Division Synchronous Code Division Multiple Access.

In a certain embodiment of the invention, the second user sets his primary address or number by sending a text (i.e. SMS) message with a predefined content or format to a predefined number in the system, whilst on another embodiment, the second user sets his primary address or number by dialling a predefined number in the system, as a result of which a procedure for changing the primary number is triggered. In the latter version, the procedure can be a so called USSD operation, Unstructured Supplementary Service Data.

The method of the invention can be implemented in a number of ways, either as hardware or software, or as a combination of hardware and software. The software may suitably be implemented as computer executable code, stored on a computer readable storage media, such as hard drives, disc drives, tape etc.

Figure 6:
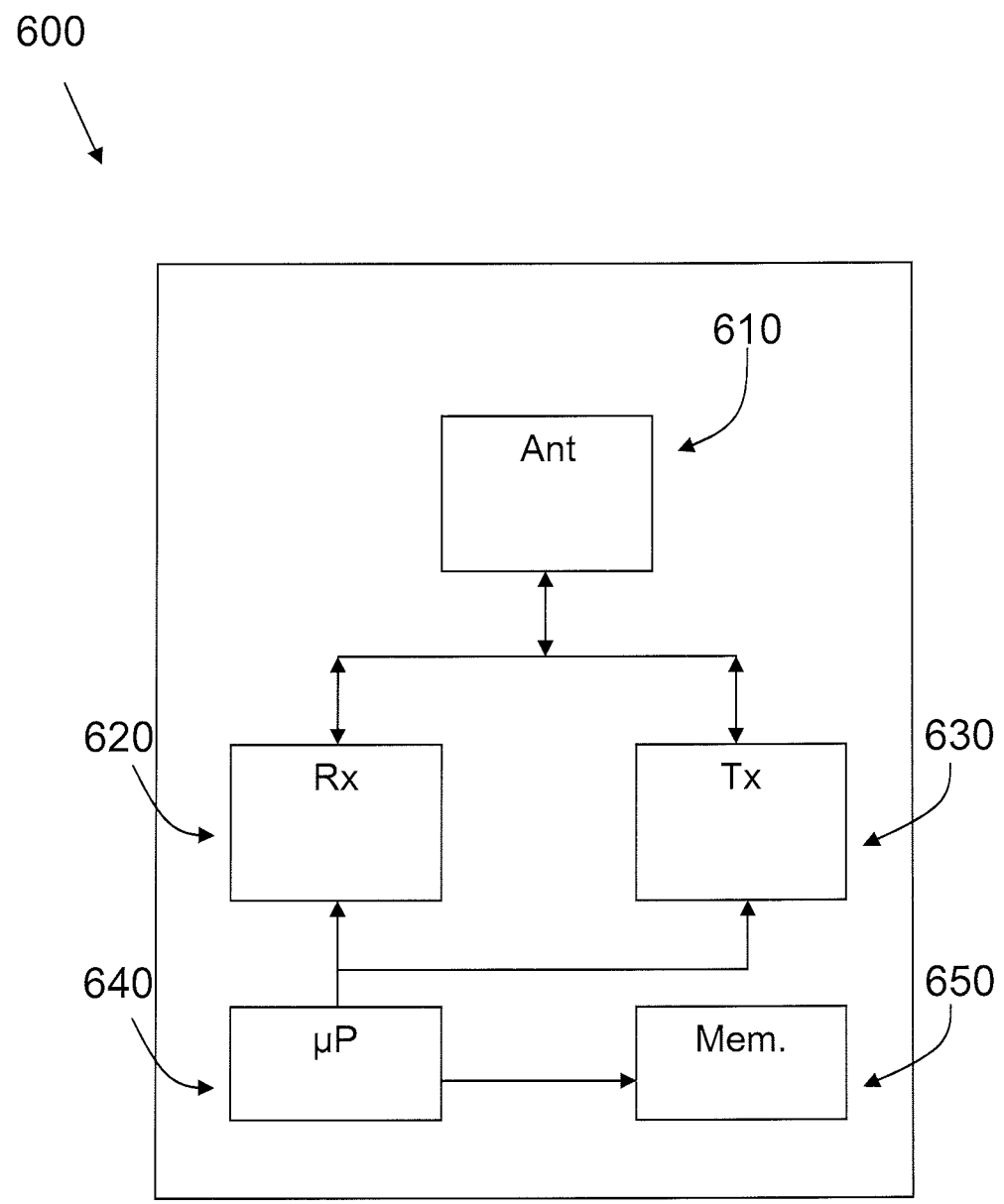
FIG. 6 shows a block diagram of a terminal of the invention.

FIG. 6 shows a schematic block diagram of a transceiver 600 for use as a user terminal in a system in which the invention is applied. As indicated in FIG. 6, the user terminal 600 will comprise an antenna, shown as block 610, and will also comprise a receive part 620 and a transmit part 630. In addition, the user terminal 600 also comprises a control means 640 such as a micro processor, as well as a memory 650. Furthermore, the user terminal 600 also comprises an interface 660 towards other components in the system apart from the UEs.

Since the major components of the user terminal 600 have been identified above both with respect to their function with and their reference numbers, they may in the following be referenced merely by their reference numbers, e.g. "the means 610", instead of "the antenna 610".

Figure 7:
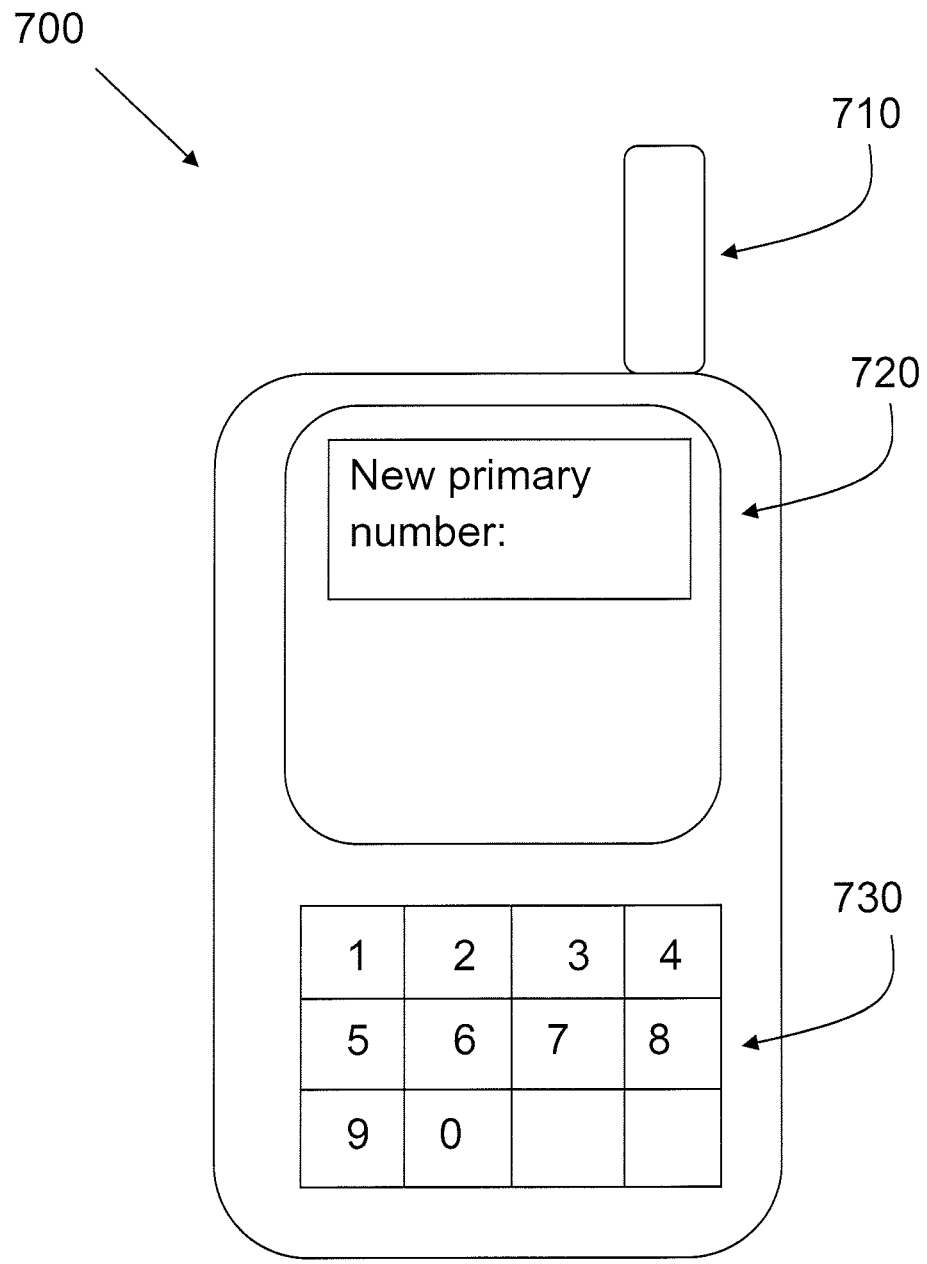
FIG. 7 shows a schematic front view of a terminal of the invention.

FIG. 7 shows a schematic front view of the user terminal 600 if the invention. As can be seen, apart from the components listed above and shown in FIG. 6, the user terminal 700 also comprises a display 720 and a keyboard 730.

The user terminal 600, 700 can be used in any of the ways described above in connection with the description of the inventive method, and thus comprises means such as, for example, the display 720 and the keyboard 730 for letting a user set one of at least two addresses as the user's primary address or number for use in outgoing traffic.

Suitably, the user terminal 600, 700 is equipped with means such as the means 640 and 650 for a so called USSD procedure with the network, an Unstructured Supplementary Service Data procedure, by means of which said primary address or number is set as the primary number.

Also, the user terminal 600, 700 is suitably equipped with an interface, such as a menu in the display 720, for changing the primary number. This is shown symbolically in FIG. 7 with the text "New primary number" in the display 720 of the terminal 700.

The invention is not limited to the examples of embodiments described above and shown in the drawings, but may be freely varied within the scope of the appended claims.

The invention claimed is:

1. A method for use in a cellular communications network that includes a plurality of mobile stations, and control functions for receiving, connecting, and directing traffic to and from said mobile stations, according to which method at least a number of said plurality of mobile stations are associated with respective individual identities which are unique in said cellular communications network, the method comprising:
   associating at least two mobile station integrated services digital network (MSISDN) addresses with a unique identity of a second mobile station, which is used by a first mobile station to establish communication with the second mobile station in the cellular communications network;
   receiving one of the at least two MSISDN addresses from the first mobile station;
   mapping the received one MSISDN address, of the at least two MSISDN addresses, to the unique identity of the second mobile station; and
   using the unique identity to establish communication with the second mobile station,
   receiving at a Home Location Register (HLR) a SMS message from the second mobile station containing a command to change the mapping of the unique identity of the second mobile station to a particular one of the MSISDN addresses indicated by the command for use in outgoing traffic from the second mobile station; and
   responsive to the command, changing at the HLR the mapping of the unique identity of the second mobile station to the particular one of the MSISDN addresses indicated by the command.

2. The method of claim 1, where the cellular communications network operates according to one of the following system standards:
   Global System for Mobile communications,
   Wideband Code Division Multiple Access,
   Time Division Synchronous Code Division Multiple Access.

3. The method of claim 1, further comprising:
   responsive to the command, sending by the HLR to a Visitor Location Register (VLR) updated subscriber data that notifies the VLR of the change to the mapping of the unique identity of the second mobile station to the particular one of the MSISDN addresses.

4. The method of claim 1, where responsive to the command, the HLR sets the particular one of the MSISDN addresses indicated by the command as a default primary number.

5. The method of claim 4, where the unique identity of the second mobile station is an International Mobile Subscriber Identity.

* * * * *